United States Patent
Wei et al.

(10) Patent No.: US 12,287,686 B2
(45) Date of Patent: Apr. 29, 2025

(54) POWER MANAGEMENT CIRCUIT, CHIP AND UPGRADE METHOD THEREFOR, AND SERVER

(71) Applicant: Sophgo Technologies Ltd., Beijing (CN)

(72) Inventors: Chao Wei, Beijing (CN); Taiqiang Cao, Beijing (CN)

(73) Assignee: Sophgo Technologies Ltd., Beijing (CN)

( * ) Notice: Subject to any disclaimer, the term of this patent is extended or adjusted under 35 U.S.C. 154(b) by 64 days.

(21) Appl. No.: 18/492,010

(22) Filed: Oct. 23, 2023

(65) Prior Publication Data
US 2024/0053810 A1    Feb. 15, 2024

Related U.S. Application Data

(60) Division of application No. 18/184,882, filed on Mar. 16, 2023, now Pat. No. 11,829,220, which is a
(Continued)

(30) Foreign Application Priority Data

Sep. 16, 2020    (CN) .......................... 202010976181.7

(51) Int. Cl.
*G06F 1/26* (2006.01)
*G06F 1/18* (2006.01)
(Continued)

(52) U.S. Cl.
CPC ................. *G06F 1/26* (2013.01); *G06F 1/18* (2013.01); *G06F 1/3203* (2013.01); *G06F 8/654* (2018.02)

(58) Field of Classification Search
CPC . G06F 1/26; G06F 1/18; G06F 1/3203; G06F 8/654
See application file for complete search history.

(56) References Cited

U.S. PATENT DOCUMENTS

2003/0191955 A1* 10/2003 Wagner ................ G06F 21/572
                                                                    713/191
2008/0307134 A1    12/2008 Geissler et al.
(Continued)

FOREIGN PATENT DOCUMENTS

| CN | 102290845 A | 12/2011 |
| CN | 102364891 A | 2/2012 |

(Continued)

OTHER PUBLICATIONS

International Search Report of corresponding International Application No. PCT/CN2021/130701, dated Feb. 10, 2022, 13 pages.
(Continued)

*Primary Examiner* — Jaweed A Abbaszadeh
*Assistant Examiner* — Gayathri Sampath
(74) *Attorney, Agent, or Firm* — Tucker Ellis LLP

(57) ABSTRACT

The present disclosure discloses a power management circuit, a chip and an upgrade method therefor, and a server. In the circuit, one terminal of a micro controller unit is connected to a control board and a processor of the chip, and the other terminal of the micro controller unit is connected to a power management integrated circuit unit, a voltage conversion unit, and a voltage regulator unit. The micro controller unit receives operation instructions sent by the control board and the processor, stores the operation instructions, reads a power-on/off operation instruction in the operation instructions that is sent by the control board, and sends the power-on/off operation instruction to the power management integrated circuit unit to enable the power management integrated circuit unit performs corresponding control on the voltage conversion unit and the voltage regulator unit to complete a power-on/off operation on the processor.

4 Claims, 3 Drawing Sheets

Related U.S. Application Data continuation of application No. PCT/CN2021/130701, filed on Nov. 15, 2021.

(51) Int. Cl.
  *G06F 1/3203* (2019.01)
  *G06F 8/654* (2018.01)

(56) References Cited

U.S. PATENT DOCUMENTS

| | | |
|---|---|---|
| 2009/0172656 A1 | 7/2009 | Landry et al. |
| 2013/0007473 A1 | 1/2013 | van der Lee |
| 2013/0173945 A1 | 7/2013 | Li |
| 2016/0140077 A1 | 5/2016 | Yoshida |
| 2016/0202741 A1 | 7/2016 | Van Der Lee |
| 2020/0210166 A1* | 7/2020 | Gore .................. G06F 8/65 |
| 2021/0064120 A1 | 3/2021 | Wang et al. |

FOREIGN PATENT DOCUMENTS

| | | |
|---|---|---|
| CN | 103019788 A | 4/2013 |
| CN | 105893091 A | 8/2016 |
| CN | 106569847 A | 4/2017 |
| CN | 109284117 A | 1/2019 |
| CN | 110096291 A | 8/2019 |
| CN | 110569148 A | 12/2019 |
| CN | 111176699 A | 5/2020 |
| CN | 111539044 A | 8/2020 |
| CN | 112148338 A | 12/2020 |

OTHER PUBLICATIONS

Office Action of corresponding Chinese Application No. 202010976181.7, dated Mar. 7, 2022, 17 pages.

Examination Report of corresponding Singapore Application No. 11202302054T, dated May 14, 2024, 6 pages.

* cited by examiner

POWER MANAGEMENT CIRCUIT, CHIP AND UPGRADE METHOD THEREFOR, AND SERVER

This application is a divisional application of U.S. patent application having Ser. No. 18/184,882 entitled "POWER MANAGEMENT CIRCUIT, CHIP AND UPGRADE METHOD THEREFOR, AND SERVER", filed on Mar. 16, 2023 that shares inventorship with the present application and which is a continuation of International Application No. PCT/CN2021/130701, filed on Nov. 15, 2021, the International Application claims priority to Chinese Patent Application No. 202010976181.7, filed with the China National Intellectual Property Administration on Sep. 16, 2020 and entitled "POWER MANAGEMENT CIRCUIT, CHIP AND UPGRADE METHOD THEREFOR, AND SERVER". The entire teachings and contents of these Patent Applications are incorporated herein by reference in their entireties.

TECHNICAL FIELD

The present disclosure relates to the field of power management technologies, and in particular, to a power management circuit, a chip and an upgrade method therefor, and a server.

BACKGROUND

Currently, when designing a system on chip (System on Chip, SOC), most integrated circuit (Integrated Circuit, IC) manufacturers also design a power management unit (Power Management Unit, PMU), namely, a power management chip. The power management chip controls an external direct current-direct current converter (DCDC) or a power management integrated circuit (Power Management IC, PMIC) to complete a power-on control operation. In this case, an extra single-chip microcomputer, for example, STM32 (ARM Cortex-M, core single-chip microcomputer), is still required to complete some data collection services. As a result, a large quantity of components are required, causing high research and development and tape-out costs, and occupying a large amount of onboard space.

SUMMARY

The present disclosure aims to solve at least one of the technical problems existing in the prior art.

Therefore, an objective of the present disclosure is to provide a power management circuit.

Therefore, a second objective of the present disclosure is to provide a chip.

Therefore, a third objective of the present disclosure is to provide a server.

Therefore, a fourth objective of the present disclosure is to provide an upgrade method for a chip.

To achieve the objectives, an embodiment of a first aspect of the present disclosure discloses a power management circuit, including: a micro controller unit, a voltage conversion unit, a power management integrated circuit unit, and a voltage regulator unit, where one terminal of the micro controller unit is separately connected to a control board and a processor of a chip, and the other terminal of the micro controller unit is separately connected to the power management integrated circuit unit, the voltage conversion unit, and the voltage regulator unit; and the micro controller unit receives operation instructions sent by the control board and the processor, stores the operation instructions, reads a power-on/off operation instruction in the operation instructions that is sent by the control board, and sends the power-on/off operation instruction to the power management integrated circuit unit to enable the power management integrated circuit unit performs corresponding control on the voltage conversion unit and the voltage regulator unit to complete a power-on/off operation on the processor.

According to the power management circuit in this embodiment of the present disclosure, a micro controller unit is added to the design. Based on many communications interfaces and abundant functions of the micro controller unit, power control and storage and collection of related data are performed by using the micro controller unit, so that stable and reliable power management can be implemented without adding additional components. Therefore, costs can be reduced, for example, research and development and tape-out costs of the power management circuit are eliminated, and on-board space is saved.

In addition, the power management circuit in this embodiment of the present disclosure may further include the following additional technical features.

In some examples, the micro controller unit is connected to the processor, the power management integrated circuit unit, and the control board by respectively using a first inter-integrated circuit to a third inter-integrated circuit, and the micro controller unit is separately connected to the voltage conversion unit and the voltage regulator unit by using a general-purpose input/output interface, where the third inter-integrated circuit has a highest interrupt priority.

In some examples, the micro controller unit is configured to: when a communication exception occurs in one or more of the first inter-integrated circuit to the third inter-integrated circuit, correspondingly switch an inter-integrated circuit in which the communication exception occurs to the general-purpose input/output interface for communication.

In some examples, the power management circuit further includes: a detection unit connected to the second inter-integrated circuit and configured to detect data transmitted in the second inter-integrated circuit and validity of the data.

In some examples, the micro controller unit includes: an upgrade unit configured to upgrade the chip in a dual-backup manner.

In some examples, the micro controller unit further includes: a reading unit configured to read a working voltage value of the processor.

In some examples, the micro controller unit further includes: a storage unit, a real-time clock unit, and a watchdog unit.

To achieve the objectives, an embodiment of a second aspect of the present disclosure discloses a chip, including the power management circuit described in the above embodiment of the present disclosure.

According to the chip in this embodiment of the present disclosure, the power management circuit of the chip is designed with an added micro controller unit. Based on many communications interfaces and abundant functions of the micro controller unit, power control and storage and collection of related data are performed by using the micro controller unit, so that stable and reliable power management can be implemented without adding additional components. Therefore, costs can be reduced, for example, research and development and tape-out costs of the power management circuit are eliminated, and on-board space is saved.

To achieve the objectives, an embodiment of a third aspect of the present disclosure discloses a server, including the power management circuit in the embodiment of the first aspect of the present disclosure or the chip in the embodiment of the second aspect of the present disclosure.

According to the server in this embodiment of the present disclosure, the power management circuit or the chip of the server is designed with an added micro controller unit. Based on many communications interfaces and abundant functions of the micro controller unit, power control and storage and collection of related data are performed by using the micro controller unit, so that stable and reliable power management can be implemented without adding additional components. Therefore, costs can be reduced, for example, research and development and tape-out costs of the power management circuit are eliminated, and on-board space is saved.

To achieve the objectives, an embodiment of a fourth aspect of the present disclosure discloses an upgrade method for a chip, where the method is applied to a micro controller unit, the micro controller unit is separately connected to a control board and a processor of the chip to receive operation instructions sent by the control board and the processor, and the method includes the following steps: reading a chip upgrade instruction in the operation instructions, and starting a boot program in a flash of the chip, to detect integrity of an application of the chip; if the detection succeeds, jumping to the application for running; otherwise, continuing to run the boot program; receiving an upgrade instruction; and loading, for execution, an upgrade program of the flash to a main memory according to the upgrade instruction, receiving upgrade data by using a second inter-integrated circuit, and completing upgrade based on the upgrade data.

Therefore, in the method, the chip is upgraded in a dual-backup manner, so that when upgrade fails, it is ensured that the system can still work normally, and upgrade can be performed again, thereby improving upgrade reliability. In addition, on-line upgrade is supported, a read/write operation can be performed on the entire flash, a remote operation can be performed, and upgrade is performed without using a programmer through disassembling, so that costs are reduced and operations are simple.

In addition, the upgrade method for a chip in the above embodiment of the present disclosure may further include the following additional technical features.

In some examples, the method further includes: storing verification information of the application to ensure integrity of the upgrade data.

According to the power management circuit provided in the present application, power control and storage and collection of related data are performed by using the micro controller unit, so that stable and reliable power management can be implemented without adding additional components. Therefore, costs can be reduced, for example, research and development and tape-out costs of the power management circuit are eliminated, and on-board space is saved.

BRIEF DESCRIPTION OF DRAWINGS

The above and/or additional aspects and advantages of the present disclosure will become apparent and readily understood from the description of embodiments in conjunction with the following accompanying drawings, in which.

DESCRIPTION OF EMBODIMENTS

Embodiments of the present disclosure will be described below in detail, the embodiments described with reference to the accompanying drawings are exemplary, and the embodiments of the present disclosure will be described below in detail.

The following describes a power management circuit, a chip and an upgrade method therefor, and a server according to the embodiments of the present disclosure with reference to FIG. 1 to FIG. 4.

Figure 1:
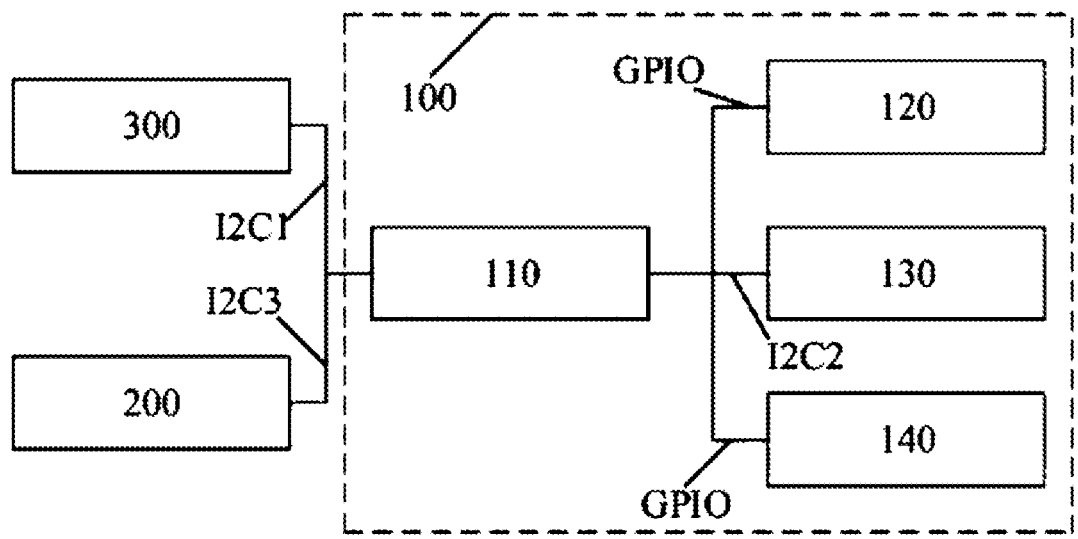
FIG. 1 is a schematic structural diagram of a power management circuit according to an embodiment of the present disclosure.

FIG. 1 is a schematic structural diagram of a power management circuit according to an embodiment of the present disclosure. As shown in FIG. 1, the power management circuit 100 includes: a micro controller unit 110, a voltage conversion unit 120, a power management integrated circuit unit 130, and a voltage regulator unit 140.

Specifically, as shown in FIG. 1, one terminal of the micro controller unit 110, namely, a micro controller unit (Micro Controller Unit, MCU), is separately connected to a control board 200 and a processor 300 of a chip, and the other terminal of the micro controller unit 110 is separately connected to the power management integrated circuit unit 130, the voltage conversion unit 120, and the voltage regulator unit 140.

The micro controller unit 110 receives operation instructions sent by the control board 200 and the processor 300, stores the operation instructions, that is, implements related functions such as data collection and storage, reads a power-on/off operation instruction in the operation instructions that is sent by the control board 200, and sends the power-on/off operation instruction to the power management integrated circuit unit 130, such that the power management integrated circuit unit 130 performs corresponding control on the voltage conversion unit 120 and the voltage regulator unit 140 to complete a power-on/off operation on the processor 300, that is, the power on/off is implemented by using the micro controller unit 110.

Therefore, the power management circuit 100 is designed with the added micro controller unit 110, namely, the MCU. Based on many communications interfaces and abundant functions of the micro controller unit 110, power control and storage and collection of related data are performed by using the micro controller unit 110, so that stable and reliable power management can be implemented without adding additional components. Therefore, costs can be reduced, for example, research and development and tape-out costs of the power management circuit 100 are eliminated, and on-board space is saved.

In an embodiment of the present disclosure, the micro controller unit 110 is connected to the processor 300, the power management integrated circuit unit 130, and the control board 200 by respectively using a first inter-integrated circuit to a third inter-integrated circuit, and the micro controller unit 110 is separately connected to the voltage conversion unit 120 and the voltage regulator unit 140 by using a general-purpose input/output interface, where the third inter-integrated circuit has a highest interrupt priority, to ensure that the processor 300 is correctly operated.

With reference to FIG. 1, the first inter-integrated circuit to the third inter-integrated circuit respectively correspond to inter-integrated circuit (I2C) 1, I2C2, and I2C3 shown in FIG. 1. In other words, the micro controller unit 110 is connected to the processor 300 by using the first inter-integrated circuit I2C1, the micro controller unit 110 is connected to the power management integrated circuit unit 130 by using the second inter-integrated circuit I2C2, and the micro controller unit 110 is connected to the control board 200 by using the third inter-integrated circuit I2C3. Therefore, in this embodiment of the present disclosure, two different I2Cs are used for communication with the MCU to complete power-on/off sequential control and obtaining of various information, respectively.

The general-purpose input/output interface corresponds to the general-purpose input/output (General-purpose input/output, GPIO) shown in FIG. 1.

In a specific embodiment, the voltage conversion unit 120 is, for example, a DCDC.

In a specific embodiment, the power management integrated circuit unit 130 is, for example, a PMIC.

In a specific embodiment, for example, a Sophon BM1684 may be selected as the processor 300, so that the chip has advantages of low power consumption, superior performance, and full customization.

In a specific embodiment, for example, ISL68127 may be selected as the voltage regulator unit 140, such that the power management circuit 100 in this embodiment of the present disclosure has a very small quantity of external elements, is easy to configure, and has a strong fault management and high-precision adjustment capability.

In a specific example, as shown in FIG. 1, the MCU, the DCDC, the PMIC, and ISL68127 form the power management circuit 100. The MCU is mounted on the first inter-integrated circuit I2C1 and the third inter-integrated circuit I2C3 as a slave device, receives operation instructions initiated by the control board 200 and BM1684, and writes and reads related instruction data. As a master device, the MCU controls a power supply by using the PMIC mounted on the second inter-integrated circuit I2C2 bus, to complete a power-on/off operation. Specifically, when the control board 200 sends a power-on/off command to the MCU by using the third inter-integrated circuit I2C3, the MCU completes a power-on/off operation on BM1684 by operating the GPIO, the PMIC, and the like according to the power-on/off command.

Further, in the power management circuit 100, an interrupt priority of the third inter-integrated circuit I2C3 is set to be the highest, that is, power-on and power-off commands are set to be processed preferentially, to ensure that the processor 300 such as BM1684 is correctly operated. In other words, a plurality of means are taken, for example, the interrupt priority is set, an interrupt mask is added, a timeout mechanism for an I2C device is added, and a GPIO operation is performed to solve a problem of device hang-up caused by the I2C protocol, so that system robustness is very good.

In an embodiment of the present disclosure, the micro controller unit 110 is configured to: when a communication exception occurs in one or more of the first inter-integrated circuit to the third inter-integrated circuit (namely, I2C1, I2C2, and I2C3), correspondingly switch an inter-integrated circuit in which the communication exception occurs to the general-purpose input/output interface GPIO for communication, to ensure normal communication and improve communication reliability.

In other words, in a possible case in which the I2C bus locks up because one transmission using the I2C protocol cannot be correctly finished, a state reset operation is completed through switching from I2C to GPIO, to ensure the normal communication and improve the communication reliability.

In an embodiment of the present disclosure, the power management circuit 100 further includes a detection unit (not shown in the figure).

The detection unit is connected to the second inter-integrated circuit I2C2, and is configured to detect data transmitted in the second inter-integrated circuit I2C2 and validity of the data, to ensure the correctness of performing an operation.

In a specific embodiment, for example, a detection and retry mechanism may be added to a place where the second inter-integrated circuit I2C2 sends a command and a place where whether the command takes effect is determined, to ensure the correctness of the execution.

In an embodiment of the present disclosure, the power management circuit 100 may support an operation of upgrading the entire flash from a main memory, that is, a random access memory (RAM).

Specifically, the micro controller unit 110 may include an upgrade unit. The upgrade unit is configured to upgrade the chip in a dual-backup manner, so that when upgrade fails, it is ensured that the system can still work normally, and upgrade can be performed again, thereby improving the upgrade reliability.

Figure 2:
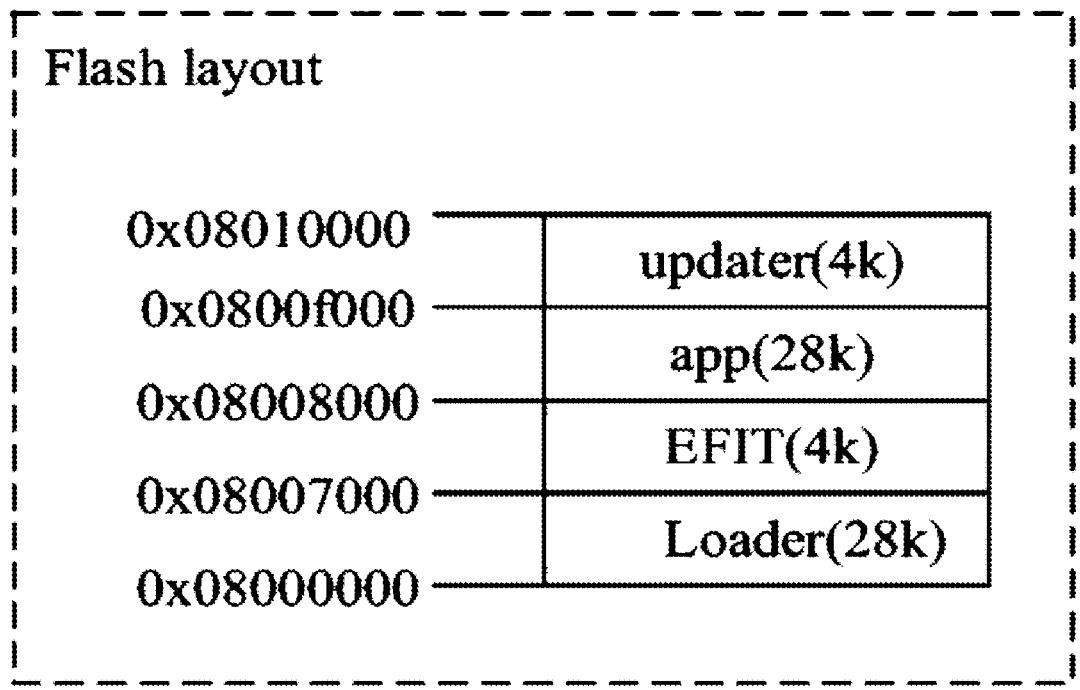
FIG. 2 is a schematic diagram of address division of a flash according to a specific embodiment of the present disclosure.

The following describes address division of a flash with reference to FIG. 2. Specifically, as shown in FIG. 2, an address of the flash may be divided into: a boot program loader, an executable file information table (Executable File Information Table, EFIT), an application app, and an upgrade program Updater.

The main function of the boot program loader is to ensure startup of the MCU and to detect the integrity of the app.

The EFIT is used to store verification information of the application to ensure the integrity of an upgrade file.

The app is a normal program during system running. Generally, a firmware version of this part is upgraded during upgrade.

The updater is an upgrade program. During upgrade, the upgrade program can be loaded from the flash into the RAM for execution, to generate upgrade data. Therefore, upgrade can be completed by performing erasure and write operations on the entire flash based on the upgrade data.

Figure 3:
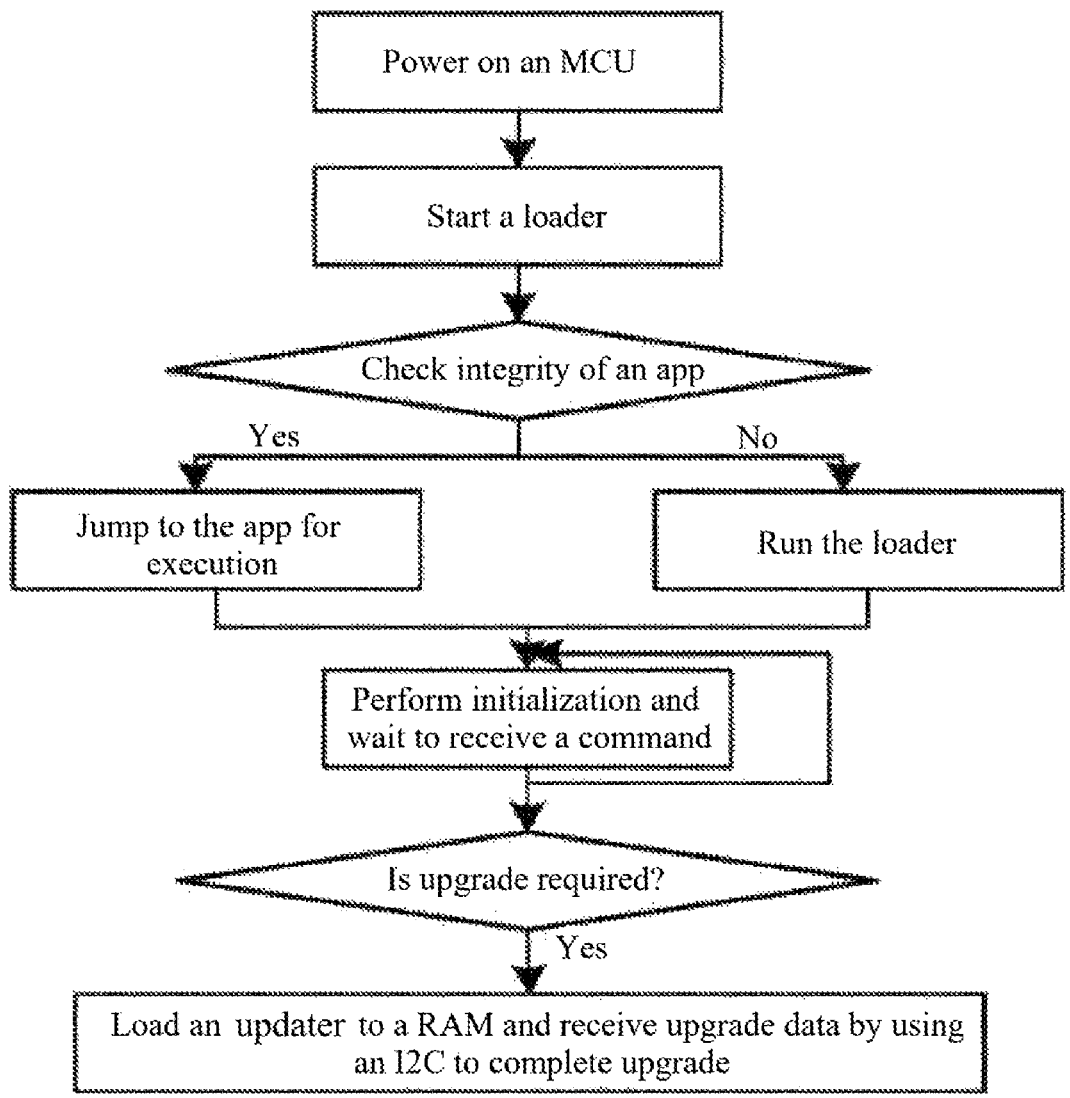
FIG. 3 is a schematic flowchart of upgrading a flash according to a specific embodiment of the present disclosure.

Specifically, in an embodiment of the present disclosure, as shown in FIG. 3, a process of upgrading the chip by the upgrade unit of the micro controller unit 110 includes:
1. powering on the MCU, and starting the boot program loader in the flash of the chip, to ensure startup of the MCU and to detect the integrity of the app of the chip;
2. if the detection succeeds, jumping to the app for running; otherwise, continuing to run the boot program loader, where in other words, if the integrity detection of the app succeeds, successfully booting into the app for running; or if the integrity detection of the app fails, running a remaining program, to ensure that a command of the control board 200 can be received, and the processor 300 such as BM1684 is successfully powered on and powered off; and further, to continue upgrade, loading the updater to enter an upgrade mode;
3. receiving an upgrade instruction, where specifically, if the upgrade instruction is received, and it is considered that there is an upgrade requirement, further upgrade is required and the upgrade mode is entered; and
4. loading, for execution, the upgrade program Updater of the flash into the main memory, that is, the RAM, according to the upgrade instruction, receiving upgrade data by using the second inter-integrated circuit I2C2, and performing erasure and write operations on the entire flash based on the upgrade data, to complete upgrade.

In other words, in this embodiment of the present disclosure, on-line upgrade is supported, a read/write operation can be performed on the entire flash, a remote operation can be performed, and upgrade is performed without using a programmer through disassembling, so that costs are reduced and operations are simple.

In an embodiment of the present disclosure, the upgrade unit of the micro controller unit 110 is further configured to: store verification information of the application to ensure integrity of the upgrade data. In a specific example, for example, the micro controller unit 110 stores verification information of the application app by using the EFIT, to ensure integrity of the upgrade file, thereby ensuring that the application app can be normally started from the boot program loader in the case of successful upgrade to complete the upgrade function.

In an embodiment of the present disclosure, the micro controller unit 110 further includes a reading unit. The reading unit is configured to: read a working voltage value of the processor 300. Specifically, the reading unit is, for example, an analog-to-digital conversion (Analog-to-Digital Converter, ADC) module. In other words, the MCU may read the working voltage value of the processor 300 by using the ADC module of the MCU.

In an embodiment of the present disclosure, the micro controller unit 110 further includes: a storage unit, a real-time clock unit, and a watchdog unit.

In a specific embodiment, the storage unit is, for example, an electrically erasable programmable read-only memory (Electrically Erasable Programmable read only memory, EEPROM). Specifically, for example, the MCU is simulated as a plurality of devices such as an EEPROM, a real-time clock (Real_Time Clock, RTC), and a watchdog in a manner in which STM32 supports a plurality of slave devices, such that the MCU has corresponding functions of the plurality of devices such as the EEPROM, the RTC, and the watchdog. Therefore, the following problems are solved: a core board in which the processor 300 such as BM1684 is located does not have data persistence and cannot save a system power-on time, and the watchdog does not take effect. Therefore, in this embodiment of the present disclosure, a plurality of scalable effective devices may be simulated by using the MCU, thereby reducing costs of a plurality of parties.

It may be understood that the MCU (micro controller unit 110) may implement many functions such as the GPIO and ADC functions, and may perform communication by using the inter-integrated circuit I2C. Based on this, in this embodiment of the present disclosure, the MCU is used to implement power control and collection of related data. In addition, because software ecology of the core single-chip microcomputer STM32 is inconvenient to use and mutual interference may occur between a plurality of I2Cs, in this embodiment of the present disclosure, optimization is performed by using the MCU, thereby improving robustness. In addition, the EEPROM built in the MCU may be used to store a MAC (Media Access Control Address, media access control) address, an SN (Serial Number, serial number), product information, and the like. Therefore, the power management circuit 100 in this embodiment of the present disclosure can stably perform power management, voltage collection, service management, and on-line upgrade.

In conclusion, in this embodiment of the present disclosure, the MCU is used to implement power control and collection of related data, so that costs can be reduced, and research and development and tape-out costs of the power management circuit 100 are reduced. Two different I2Cs are used to communicate with the MCU to complete power-on/off sequential control and obtaining of various information, respectively. Power management and voltage sampling can be implemented. A plurality of scalable effective devices can be simulated, thereby reducing costs of a plurality of parties. On-line upgrade is supported, a read/write operation can be performed on the entire flash, a remote operation can be performed, and upgrade is performed without using a programmer through disassembling, so that costs are reduced and operations are simple. The EEPROM built in the MCU may be used to store the MAC address, the SN, and the product information. A plurality of means are taken, for example, the interrupt priority is set, an interrupt mask is added, a timeout mechanism for an I2C device is added, and a GPIO operation is performed to solve a problem of device hang-up caused by the I2C protocol, so that system robustness is improved.

According to the power management circuit in this embodiment of the present disclosure, a micro controller unit is added to the design. Based on many communications interfaces and abundant functions of the micro controller unit, power control and storage and collection of related data are performed by using the micro controller unit, so that stable and reliable power management can be implemented without adding additional components. Therefore, costs can be reduced, for example, research and development and tape-out costs of the power management circuit are eliminated, and on-board space is saved.

An embodiment of the present disclosure further provides a chip, and the chip includes the power management circuit described in any one of the above embodiments of the present disclosure.

Therefore, a corresponding and specific implementation of the chip in this embodiment of the present disclosure is similar to a specific implementation of the power management circuit in the embodiments of the present disclosure. For details, reference is made to descriptions of the power management circuit. To reduce redundancy, details are not described herein again.

According to the chip in this embodiment of the present disclosure, the power management circuit of the chip is designed with an added micro controller unit. Based on many communications interfaces and abundant functions of the micro controller unit, power control and storage and collection of related data are performed by using the micro controller unit, so that stable and reliable power management can be implemented without adding additional components. Therefore, costs can be reduced, for example, research and development and tape-out costs of the power management circuit are eliminated, and on-board space is saved.

In addition, other constituents and functions of the chip according to the above embodiment of the present disclosure are known to a person of ordinary skill in the art. To reduce redundancy, details are not described.

A further embodiment of the present disclosure further provides a server, including the power management circuit described in any one of the above embodiments of the present disclosure or the chip described in any one of the above embodiments of the present disclosure.

Therefore, a corresponding and specific implementation of the server in this embodiment of the present disclosure is similar to a specific implementation of the power management circuit or the chip in the embodiments of the present disclosure. For details, reference is made to descriptions of the power management circuit or the chip. To reduce redundancy, details are not described herein again.

According to the server in this embodiment of the present disclosure, the power management circuit or the chip of the server is designed with an added micro controller unit. Based on many communications interfaces and abundant functions of the micro controller unit, power control and storage and collection of related data are performed by using the micro controller unit, so that stable and reliable power management can be implemented without adding additional components. Therefore, costs can be reduced, for example, research and development and tape-out costs of the power management circuit are eliminated, and on-board space is saved.

In addition, other constituents and functions of the server according to the above embodiment of the present disclosure are known to a person of ordinary skill in the art. To reduce redundancy, details are not described.

A further embodiment of the present disclosure further provides an upgrade method for a chip. The chip may be, for example, the chip described in any one of the above embodiments of the present disclosure, that is, the chip may include the power management circuit described in any one of the above embodiments of the present disclosure.

Figure 4:
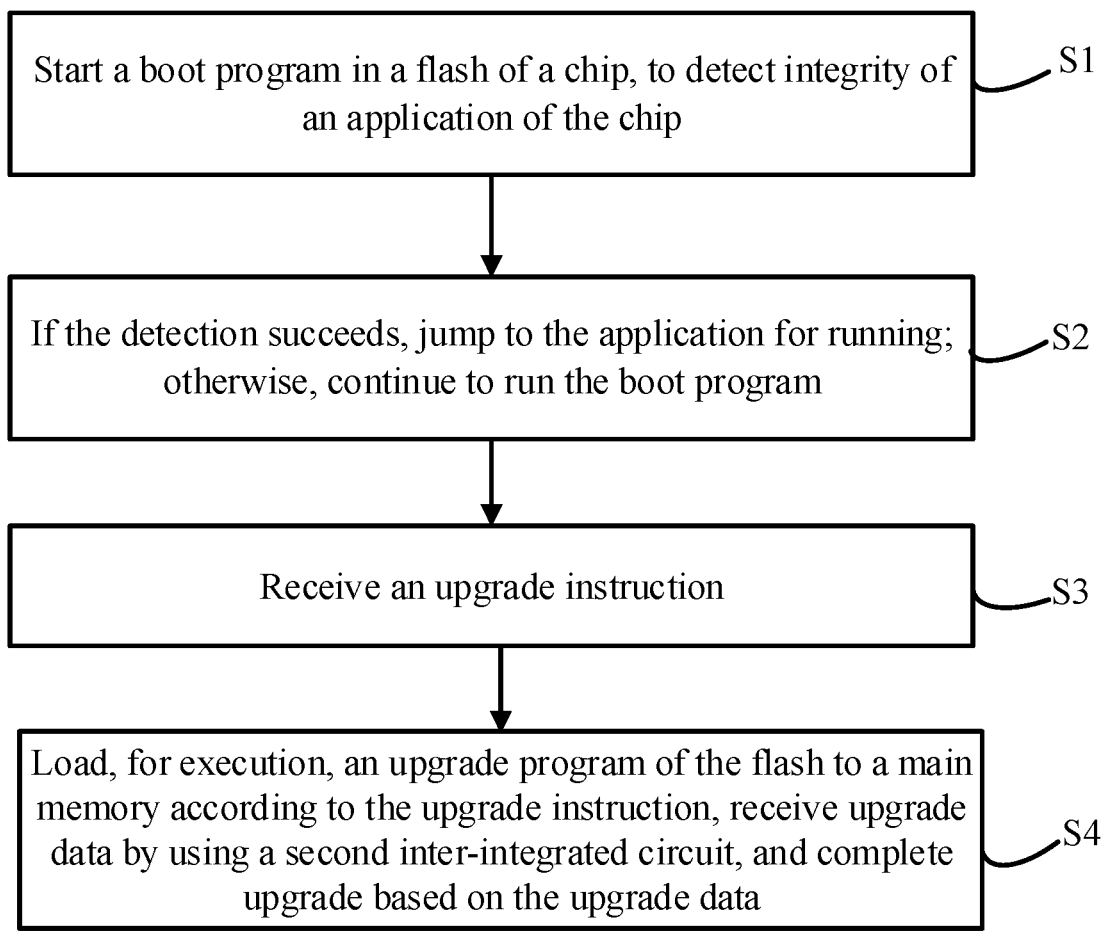
FIG. 4 is a flowchart of an upgrade method for a chip according to an embodiment of the present disclosure.

FIG. 4 is a flowchart of an upgrade method for a chip according to an embodiment of the present disclosure.

The upgrade method for a chip is applied to a micro controller unit, that is, the micro controller unit performs the method. The micro controller unit is separately connected to a control board and a processor of the chip to receive operation instructions sent by the control board and the processor. As shown in FIG. 4, the upgrade method for a chip includes the following steps.

In step S1, the micro controller unit reads a chip upgrade instruction in the operation instructions, and starts a boot program in a flash of the chip, to detect integrity of an application of the chip. It may be understood that the micro controller unit receives, for example, a plurality of operation instructions sent by the control board and the processor, and the plurality of operation instructions may include a chip upgrade instruction. When the micro controller unit reads the chip upgrade instruction, the micro controller unit upgrades the chip according to the chip upgrade instruction.

In step S2, if the detection succeeds, jumping to the application for running; otherwise, continuing to run the boot program.

In step S3, receiving an upgrade instruction.

In step S4, loading, for execution, an upgrade program of the flash to a main memory based on the upgrade instruction, receiving upgrade data by using a second inter-integrated circuit, and completing upgrade based on the upgrade data.

Therefore, in the method, the chip is upgraded in a dual-backup manner, so that when upgrade fails, it is ensured that the system can still work normally, and upgrade can be performed again, thereby improving upgrade reliability.

In a specific embodiment, as shown in FIG. 2, an address of the flash of the chip may be divided into: a boot program loader, an executable file information table (Executable File Information Table, EFIT), an application app, and an upgrade program Updater.

The main function of the boot program loader is to ensure startup of the MCU and integrity detection of the app.

The EFIT is used to store verification information of the application to ensure integrity of an upgrade file.

The app is a normal program during system running. Generally, a firmware version of this part is upgraded during the upgrade.

The updater is an upgrade program. During the upgrade, the upgrade program can be loaded from the flash into the RAM for execution, to generate upgrade data. Therefore, the upgrade can be completed by performing erasure and write operations on the entire flash based on the upgrade data.

Specifically, a process of the upgrade method for a chip in this embodiment of the present disclosure may be summarized as follows:

1. powering on the MCU, and starting the boot program loader in the flash of the chip, to ensure startup of the MCU and integrity detection of the application app of the chip;
2. if the detection succeeds, jumping to the application app for running; otherwise, continuing to run the boot program loader, where in other words, if the integrity detection of the application app succeeds, successfully booting into the application app for running; or if the integrity detection of the application app fails, running a remaining program, to ensure that a command of the control board 200 can be received, and the processor 300 such as BM1684 is successfully powered on and powered off; and further, to continue upgrade, loading the updater to enter an upgrade mode;
3. receiving an upgrade instruction, where specifically, if the upgrade instruction is received, and it is considered that there is an upgrade requirement, further upgrade is required and the upgrade mode is entered; and
4. loading, for execution, the upgrade program Updater of the flash into the main memory, that is, the RAM, according to the upgrade instruction, receiving upgrade data by using the second inter-integrated circuit I2C2, and performing erasure and write operations on the entire flash based on the upgrade data, to complete the upgrade.

In other words, according to the method, on-line upgrade is supported, a read/write operation can be performed on the entire flash, a remote operation can be performed, and upgrade is performed without using a programmer through disassembling, so that costs are reduced and operations are simple.

In an embodiment of the present disclosure, the method further includes: storing verification information of the application to ensure integrity of the upgrade data. In a specific example, for example, the EFIT is used to store verification information of the application app, to ensure integrity of the upgrade file, thereby ensuring that the application app can be normally started from the boot program loader in the case of successful upgrade to complete the upgrade function.

According to the upgrade method for a chip in this embodiment of the present disclosure, the chip is upgraded in a dual-backup manner, so that when upgrade fails, it is ensured that the system can still work normally, and upgrade can be performed again, thereby improving upgrade reliability. In addition, on-line upgrade is supported, a read/write operation can be performed on the entire flash, a remote operation can be performed, and upgrade is performed without using a programmer through disassembling, so that costs are reduced and operations are simple.

In the description of the present disclosure, it should be understood that orientation or position relationships indicated by terms such as "center", "longitudinal", "transverse", "length", "width", "thickness", "up", "down", "front", "rear", "left", "right", "vertical", "horizontal", "top", "bottom", "inside", "outside", "clockwise", "counter-clockwise", "axial", "radial", and "circumferential" are based on orientation or position relationships shown in the accompanying drawings and are merely for ease of description of the present disclosure and simplification of the description, rather than indicating or implying that the apparatuses or elements referred to must have a specific orientation or be constructed and operated in a specific orientation, and therefore cannot be construed as limiting the present disclosure.

In the description of the present disclosure, "a plurality of" means two or more.

In the description of the specification, the description with reference to terms such as "an embodiment", "some embodiments", "a schematic embodiment", "an example", "a specific example", or "some examples" means that specific features, structures, materials, or characteristics described in combination with the embodiment(s) or example(s) are included in at least one embodiment or example of the present disclosure. In this specification, the schematic expressions of the above terms do not necessarily refer to the same embodiments or examples.

Although the embodiments of the present disclosure have been shown and described, those of ordinary skill in the art can understand that various changes, modifications, substitutions and variations can be made to these embodiments without departing from the principles and spirit of the present disclosure. The scope of the present disclosure is defined by the claims and equivalents thereof.

What is claimed is:

1. An upgrade method for a chip, applied to a micro controller unit, the micro controller unit is connected to a control board through a third inter-integrated circuit and connected to a processor of the chip through a first inter-integrated circuit, to receive operation instructions sent by the control board and the processor;

wherein the upgrade method comprises the following steps:

receiving a plurality of operation instructions sent by the control board and the processor, wherein the plurality of operation instructions include an upgrade instruction;

reading the upgrade instruction in the operation instructions, and starting a boot program in a flash of the chip, to detect integrity of an application of the chip;

if detection for the integrity of the chip is successful, jumping to the application for running; otherwise, continuing to run the boot program;

receiving the upgrade instruction; and loading, for execution, an upgrade program of the flash to a main memory based on the upgrade instruction, receiving upgrade data from a second inter-integrated circuit connecting the micro controller unit and a power management integrated circuit unit, and completing upgrade based on the upgrade data.

2. The upgrade method for the chip according to claim 1, further comprising:

storing verification information of the application to ensure integrity of the upgrade data.

3. The upgrade method for the chip according to claim 1, wherein the chip is upgraded in a dual-backup manner.

4. The upgrade method for the chip according to claim 1, where the third inter-integrated circuit has a highest interrupt priority.

\* \* \* \* \*